US010071533B2

(12) United States Patent
Jenter et al.

(10) Patent No.: US 10,071,533 B2
(45) Date of Patent: Sep. 11, 2018

(54) SHAFT ARRANGEMENT IN A REVERSE VENDING MACHINE

(71) Applicant: TOMRA SYSTEMS ASA, Asker (NO)

(72) Inventors: Holger Jenter, Oslo (NO); Thomas Völkle, Balingen-Heselwangen (DE); Terje Dehli, Rosenfeld-Täbingen (DE)

(73) Assignee: TOMRA SYSTEMS ASA, Asker (NO)

( * ) Notice: Subject to any disclaimer, the term of this patent is extended or adjusted under 35 U.S.C. 154(b) by 0 days.

(21) Appl. No.: 15/574,673

(22) PCT Filed: May 30, 2016

(86) PCT No.: PCT/EP2016/062111
§ 371 (c)(1),
(2) Date: Nov. 16, 2017

(87) PCT Pub. No.: WO2016/193193
PCT Pub. Date: Dec. 8, 2016

(65) Prior Publication Data
US 2018/0147804 A1 May 31, 2018

(30) Foreign Application Priority Data

May 29, 2015 (EP) ..................................... 15169884

(51) Int. Cl.
*B30B 9/32* (2006.01)
*B30B 3/00* (2006.01)
(Continued)

(52) U.S. Cl.
CPC .............. *B30B 9/325* (2013.01); *B30B 3/005* (2013.01); *B30B 3/04* (2013.01); *G07F 9/10* (2013.01)

(58) Field of Classification Search
CPC .. B30B 3/00; B30B 3/005; B30B 3/04; B30B 3/06; B30B 9/20; B30B 9/202;
(Continued)

(56) References Cited

U.S. PATENT DOCUMENTS 3,132,581 A * 5/1964 Isbey ...................... B32B 27/00
100/171
5,236,542 A * 8/1993 Bailey ...................... G03F 3/102
100/168

(Continued)

FOREIGN PATENT DOCUMENTS

DE  10 2012 009590 B3  8/2013
JP  2004-136309 A  5/2004
JP  2005-147329 A  6/2005

OTHER PUBLICATIONS

International Search Report (PCT/ISA/210) dated Sep. 1, 2016, by the European Patent Office as the International Searching Authority for International Application No. PCT/EP2016/062111.
(Continued)

*Primary Examiner* — Jimmy T Nguyen
(74) *Attorney, Agent, or Firm* — Buchanan Ingersoll & Rooney P.C.

(57) ABSTRACT

A shaft arrangement for a reverse vending machine, in particular for a compressing arrangement in a reverse vending machine used for recycling. The shaft arrangement includes a sidewall having an inside and an outside, and at least one opening, and at least one shaft extending through the at least one opening, and the at least one shaft includes a radial groove. The shaft arrangement includes a bearing arrangement arranged on the outside of the sidewall, the bearing arrangement includes a bearing block and a bearing connected to the at least one shaft. The shaft arrangement includes a seal arranged around the outer surface of the at least one shaft at the at least one opening. The bearing block
(Continued)

is arranged spaced apart from the sidewall to create a gap between the sidewall and the bearing block. The shaft arrangement further includes a plate arranged on the inside of the sidewall.

13 Claims, 4 Drawing Sheets

(51) Int. Cl.
*G07F 9/10* (2006.01)
*B30B 3/04* (2006.01)

(58) Field of Classification Search
CPC ........... B30B 7/207; B30B 9/32; B30B 9/325; B30B 11/208; B02C 19/00; B02C 21/005; G07F 9/10
USPC ...................................... 100/155 R, 175, 176
See application file for complete search history.

(56) References Cited

U.S. PATENT DOCUMENTS

| | | | |
|---|---|---|---|
| 5,560,552 A | | 10/1996 | Powell et al. |
| 6,082,988 A | * | 7/2000 | Muller .................... A21C 3/027 100/175 |
| 2013/0074713 A1 | * | 3/2013 | Lai ......................... B65H 23/34 100/176 |

OTHER PUBLICATIONS

Written Opinion (PCT/ISA/237) dated Sep. 1, 2016, by the European Patent Office as the International Searching Authority for International Application No. PCT/EP2016/062111.

* cited by examiner

SHAFT ARRANGEMENT IN A REVERSE VENDING MACHINE

TECHNICAL FIELD OF THE INVENTION

The present invention relates to a shaft arrangement for a container compressing arrangement, and more specifically for a reverse vending machine.

BACKGROUND

Reverse vending machines (RVMs) have several areas of use, for example an RVM may be used for recycling containers such as cans or bottles made of plastics or metals and which are e.g. used for beverages. After registration or identification of a container inserted into the RVM used for recycling, a container compressing arrangement, also known as a crusher, is used to compress or crush the container to minimize the space needed to store recycled cans or bottles, and possibly to ensure that cans and bottles may not be recycles a second or further time. A container compressing arrangement used for crushing used beverage containers typically comprises two counter-rotating shafts having teeth or other means for grabbing the cans or bottles and compressing or crushing them between the two shafts as they rotate. The shafts are supported by bearing in order to rotate. The containers often contain residual liquids to some extent at the time of recycling. When the containers are being crushed or compressed, the residual liquid splashes inside the compressing arrangement, and especially on and along the shafts.

Some liquids, such as soda, are both acidic and have high sugar content. Liquids with high sugar content will over time build up sticky residue, i.e. a coating of sugar as the liquid evaporates. Hence, there is a need for an improved drainage of the reverse vending machine.

SUMMARY

It would be advantageous to provide a shaft arrangement for a reverse vending machine overcoming, or at least alleviating, the drawback mentioned above.

According to a first aspect of the present invention, this and other objectives are achieved by a shaft arrangement in a reverse vending machine. The shaft arrangement comprises a sidewall having an inside and an outside, and at least one opening, the shaft arrangement further comprises at least one shaft extending through the at least one opening, and the at least one shaft comprises a radial groove. The shaft arrangement further comprises a bearing arrangement arranged on the outside of the sidewall, the bearing arrangement comprises a bearing block and a bearing connected to the at least one shaft. The shaft arrangement further comprises a seal arranged in the at least one opening in the side wall and around the at least one shaft. The bearing block is arranged spaced apart from the sidewall to create a gap between the sidewall and bearing block. The shaft arrangement further comprises a plate arranged on the inside of the sidewall. The plate comprises a protruding portion that extends into the radial groove so as to form a passage between the radial groove and the plate.

The present invention is based on the realization that the combination of the above recited features provides an improved shaft arrangement for a reverse vending machine. Firstly, the passage created by the plate, protruding portion and the radial groove impedes or prevents liquids from reaching the opening in the side wall. The plate hinders splashing liquids from directly reaching the opening, and a liquid which enters the passage between the radial groove and the protruding portion may drain off the shaft. Secondly, any liquid that makes it through the passage and reaches the seal as the opening in the side wall, and is prevented by the seal from passing through the opening. Thirdly, any liquid that passes the seal to the outside of the sidewall, reaches the gap and is likely to drain off the shaft before reaching the bearing. This arrangement has the further advantage that the gap between the bearing block and sidewall also allows cleaning of any residue and/or debris that builds up at the gap or sidewall. The expression drain off should in the context of this application be understood as the liquid leaving the at least one shaft, due to e.g. the forces of gravity.

In one embodiment of the invention, the at least one shaft may further comprise a flange extending axially towards the sidewall to form an axial groove, between the radial groove and the at least one opening, to receive the seal. The axial groove which receives the seal further decreases the likelihood of a residual liquid reaching the bearing. As a liquid encountering the seal also has to pass through the axial groove which has received the seal. Thereby, a longer path is created so that a liquid is more likely to drain off the at least one shaft. The seal may be arranged in the at least one opening in the sidewall. For example, the seal may be arranged between the at least one shaft and edges of the at least one opening. Arranging the seal in the at least one opening allows the seal to be fastened to the sidewall and provide a sealing function between the at least one opening in the sidewall and the at least one shaft. Alternatively, the seal may be formed by a portion of the sidewall. For example, the edges of at least one opening may be punched and drawn, at the time the at least one opening is formed or manufactured in the sidewall, to form the shape of the seal.

In relation to this invention the term side wall refers to an inner or outer side wall, i.e. the side wall may e.g. be a part of the housing of the reverse vending machine, or may be a plate or side wall arranged inside the housing; or may be one of a plurality of plates or walls when there is no housing.

In all embodiments of the invention, the bearing arrangement may optionally further comprise a bearing seal, which comprises an inner ring attached to the at least one shaft and an outer ring attached to the bearing block such that the inner ring and outer ring may rotate relative each other. The bearing seal may be arranged between the bearing and the gap along at least one of said at least one shaft. The bearing seal further protects the bearing from any liquid which has passed the gap. A bearing seal where the inner ring and outer ring can rotate relative each other may generally be known as the cassette seal.

In various embodiments of the invention, the bearing seal may have axial symmetry in the axial direction and around each shaft.

The bearing seal may further comprise at least two sealing lips forming sealing chambers between the at least two sealing lips in a direction orthogonal to the axial direction. The sealing lips may extend from either the inner ring towards the outer ring, or from the inner ring towards the outer ring. The sealing lips may extend from both the inner ring and the outer ring towards the other one of the inner ring and the outer ring. The sealing lips and sealing chambers form a labyrinth which make it difficult for liquids to penetrate the seal.

The sealing chambers may be filled with a sealing composition. The sealing composition provides even further protection through hindering liquids from entering the seal, as any liquids would need to penetrate or displace the sealing composition. The sealing composition may e.g. be grease.

Providing a bearing seal as discussed above, increases the drainage as the liquid does not enter into the seal to the same extent. Moreover, the sticky residue sometimes present in the empty containers can over time cover or fill up drainage holes, and might also rub on surfaces and tear on e.g. the seals. Providing the shaft with a bearing seal as discussed above, may increase the life time of bearings, reduce the risk of catastrophic failures and lower the costs for regular maintenance.

In one embodiment of the invention, the radial groove may be arranged at a distance from the sidewall. Any liquids which penetrate through the passage and radial groove then need to be transported a longer distance along the shaft before reaching the at least one opening. The distance from the sidewall, i.e. in the axial direction, at which the radial groove is arranged may be 30 mm, or 25 mm, or 20 mm, or 15 mm, or 10 mm, or 5 mm, or any value in between. Further, it should be understood that the total distance the liquid traverses may be even longer, as the liquid also traverses radial distances of the shaft such as the passage formed by the protruding portion and the radial groove, and possibly the axial groove which receives the seal. The total distance a liquid has to traverse along the shaft to reach the gap may be may be 35-85 mm, such as 60 mm.

In another embodiment of the invention, the protruding portion may extend partially around the at least one shaft for at least 10%, preferably 25% and more preferably 40% or more of the circumference of the shaft. By extending the protruding portion around the circumference of the at least one shaft, splashing liquids can be prevented from bypassing the radial groove and passage before reaching the sidewall or the at least one opening.

The gap formed between the bearing block and the sidewall may be at least 4 mm wide, or the gap may be at least 5 mm wide, or the gap may be at least 6 mm wide or the gap may be a least 7 mm wide, or the gap may be at least 8 mm wide. The gap provides a distance in which a liquid may drain off the at least one shaft before reaching the bearing block. Hence, a wider gap decreases the likelihood for any liquid to reach the bearing.

The protruding portion may be arranged at a first end of the plate, and the plate comprises a second end, opposite the first end, and a tapered portion arranged between the first end and the second end. The tapered portion may taper towards the side wall as seen from the first end. By tapering a portion of the plate, there is less chance that an object to be compressed, e.g. a bottle, a can or another type of container, becomes stuck on top of the plate. Hence, the second end may be understood as the top of the plate whereas the first end and protruding portion may be understood as the bottom of the plate. The tapered portion may be provided with a desired tapering by increasing the length of the tapered portion in relation to the other portions of the plate, or the length of the plate in general, or by decreasing the thickness of the plate.

The thickness of the plate may be less than 25 mm, preferably less than 20 mm, and more preferably less than 15 mm at the first end of the plate and in the axial direction. The plate may be formed in a single piece. The plate may be solid in order to provide a sufficient strength and stiffness to withstand the operational conditions within a compressing arrangement where containers may be pulled and pushed against the plate while being compressed. The plate may be made of a plastic material, such as PE or ABS, as plastic materials are relatively cheap, strong and easy to manufacture. Alternatively, the plate may be made of PTFE.

In various embodiments of the invention, each one of the at least one shaft may be used as a container compressing arrangement in e.g. a reverse vending machine. The shaft arrangement may thus be used to advantage in a reverse vending machine handling the recycling of bottles or cans and other containers. Hence, each one of the at least one shaft may be used for compressing containers when the reverse vending machine is in use.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing different embodiments of the invention.

All the figures are schematic, not necessarily to scale, and generally only show parts which are necessary in order to elucidate the embodiments, wherein other parts may be omitted or merely suggested. Like reference numerals refer to like elements throughout the description.

DETAILED DESCRIPTION OF THE DRAWINGS

In the present detailed description, embodiments of a shaft arrangement according to the present invention are mainly discussed with reference to schematic views showing a shaft arrangement in a container compressing arrangement for a reverse vending machine. It should be noted that this by no means limit the scope of the invention, which is also applicable in other circumstances for instance with other types or variants of shafts, bearings or seals than the embodiments shown in the appended drawings. Further, that specific components are mentioned in connection to an embodiment of the invention does not mean that those components cannot be used to an advantage together with other embodiments of the invention. The invention will now be described with reference to the enclosed drawings where first attention will be drawn to the structure, and then secondly the function.

Figure 1:
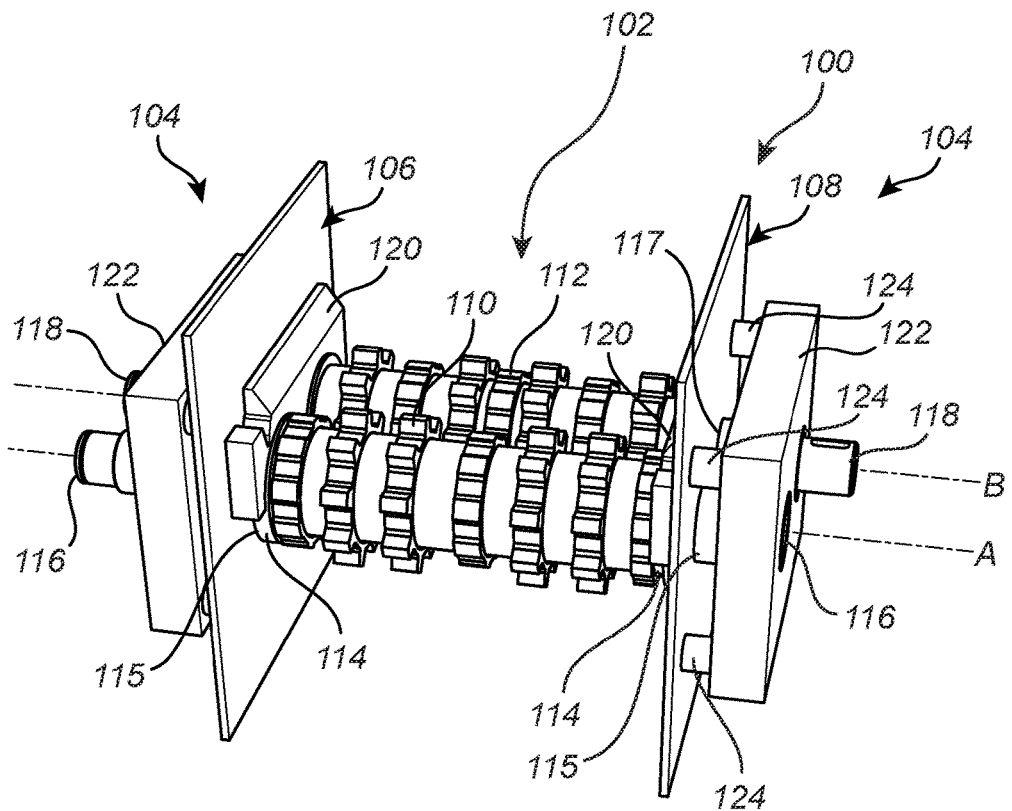
FIG. 1 is a perspective view of a container compressing arrangement for a reverse vending machine comprising a shaft arrangement according to one embodiment of the invention.

FIG. 1 shows a perspective view of a container compressing arrangement 100 for a reverse vending machine comprising a shaft arrangement according to as embodiment of the invention. It will be appreciated that the examples of various features of the shaft arrangement described with reference to FIG. 1 are combinable with other embodiments described hereinafter with reference to the appended drawings.

The container compressing arrangement 100 has an inside 102 and an outside 104. The inside 102 and outside 104 is separated by two sidewalls, a first sidewall 106 and a second sidewall 108. The first and second sidewall 106, 108 are made of metal, e.g. a sheet metal plate with some measures taken for corrosion protection, e.g. being galvanized or painted. The first and second sidewall 106, 108 may be flat.

The container compressing arrangement 100 comprises a first shaft 110 and a second shaft 112 arranged between the first and second sidewall 106, 108. The first shaft 110 has a longitudinal axis A, and the second shaft 112 has a longitudinal axis B. The first and second shaft 110, 112 are arranged next to each other with their respective longitudinal axes A, B arranged in parallel. The first and second shaft 110, 112 are made of metal, e.g. steel, stainless steel or the like. The longitudinal ends 116 of the first shaft 110 extends through opening 115 in the sidewalls 106, 108, and through a bearing arrangement 122 arranged on the outside 104 of the first sidewall 108, and through a bearing arrangement 122 arranged on the outside 104 of the second sidewall 108. Likewise, the longitudinal ends of the second shaft 118 extend through openings 117 in the sidewalls 106, 108 and through the bearing arrangements 122 arranged on the outside of the sidewalls 106, 108.

In FIGS. 2-5 the shaft arrangement of the present invention is shown with reference to a single side, the right side of FIG. 1 comprising the second sidewall 108, of the container compressing arrangement 100. It should be noted that the same features and structural relations of course also apply to the other side of the container compressing arrangement 100 in order to protect the bearings arranged in each bearing block 122.

Each one of the first and second shaft 110, 112 comprises teeth or other means for grabbing, compressing, tearing or cutting bottles or cans which are fed into the compressing arrangement 100. The first and second shaft 110,112 should be understood to in general have substantially circular cross sections, e.g. being cylindrical shafts in general, such that any liquid which lands on the first or second shaft 110, 112 may drain off. The longitudinal ends 116, 118 of the first and second shaft 110, 112 may be connected via suitable means for rotating the shafts (not shown), such as cogs, wheels or chains, to means for driving (not shown) the shafts 110, 112. Each one of the first and second shaft 110, 112 according to the present invention further comprises radial grooves 114 arranged at a distance from the respective opening 115, 117 at each end of the shaft, i.e. the first and second shaft 110, 112 each has two radial grooves, one radial groove 114 arranged at a distance from the first sidewall 106 and another radial groove 114 arranged at a distance from the second sidewall 108. The radial groove 114 of the second shaft 112 may be seen more clearly in e.g. FIG. 3. The radial grooves 114 of the second shaft 112 may be substantially identical to the radial grooves 114 of the first shaft 110.

The shaft arrangement of the present invention comprises a plate 120 arranged on the inside 120 of each sidewall 106, 108. The plate 120 prevents residual liquids from directly splashing and reaching the opening 115, 117. The plates 120 are arranged in what is understood to be an upwards direction from the shafts 110, 112. In other word, the plates 120 are mounted to the sidewalls 106, 108 above the shafts 110, 112 when the container compressing arrangement 100 is arranged for normal operation.

The bearing arrangements 122 arranged on the outside of the sidewalls 106, 108 comprise bearing blocks 122. A bearing (not shown) is arranged within each bearing block 122 for each shaft, such that the first and second shafts 110, 112 are connected to and supported by the bearings in the bear blocks 122. The bearing may be of any suitable type such as rolling-element bearing, a ball bearing or the like. The bearing blocks 122 are attached to and spaced apart from the sidewalls by spacers 124. The spacers 124 may be formed by the material of the bearing block 122. The bearing block 122 and the spacers 124 may be made of metal. Hence, the spacers 124 may be formed when the bearing block 122 is manufactured, e.g. by casting. Alternatively, the spacers 124 may be separate components and comprise a nut and bolt arrangement or the like.

It should of course be noted that a complete container compressing arrangement 100 may comprise further components such as e.g. longitudinal walls to form a complete enclosure, driving arrangements to drive compressing arrangement, means for feeding bottles or cans to the compressing arrangement, etc.

In use, the container compressing arrangement 100 is used to compress or crush bottles or cans for recycling. The first and second shaft 110, 112 rotate, in particular the first and second shaft 110, 112 rotates in opposite directions with respect to each other, e.g. the first shaft 110 rotates clockwise and the second shaft 112 rotates anti-clockwise as seen along the longitudinal axes A and B. Thereby, any bottle or can entering the container compressing arrangement 100 is compressed between the first and second shaft 110, 112 as they rotate and their teeth engage with the bottle or can to pull it between the first and second shaft 110, 112. Residual liquids within such containers may splash towards the sidewalls 106, 108 or leak onto the shafts 110, 112 while being compressed between the shafts 110, 112.

Figure 2:
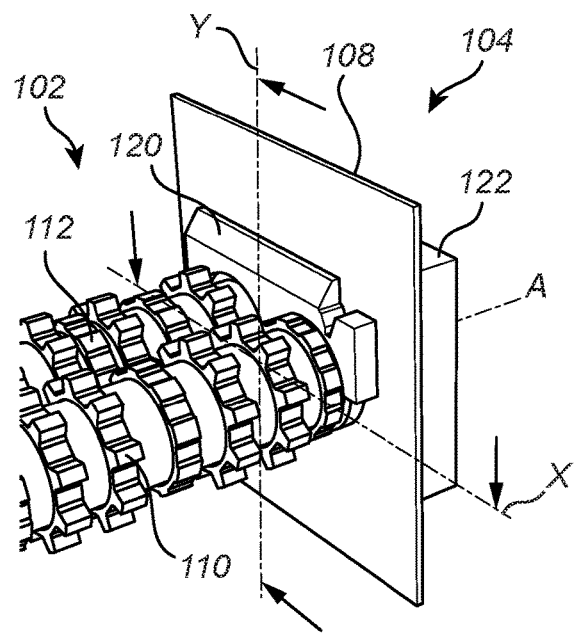
FIG. 2 is a perspective view of the shaft arrangement for a reverse vending machine in FIG. 1 as seen from a different perspective.
Figure 3:
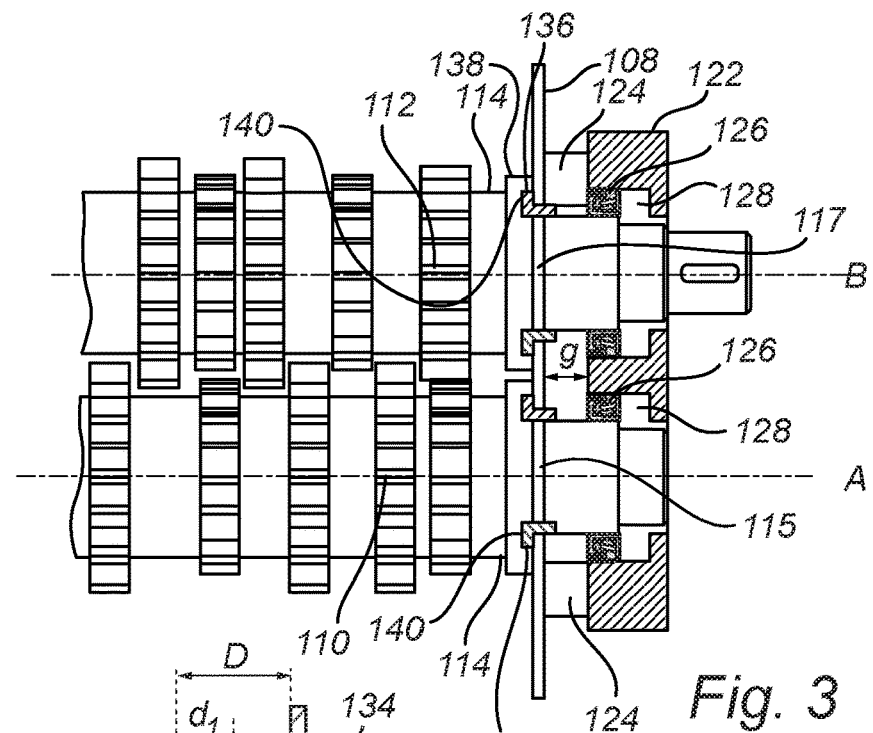
FIG. 3 is a partial side view and partial cross section of the shaft arrangement shown in FIG. 2.
Figure 4A:
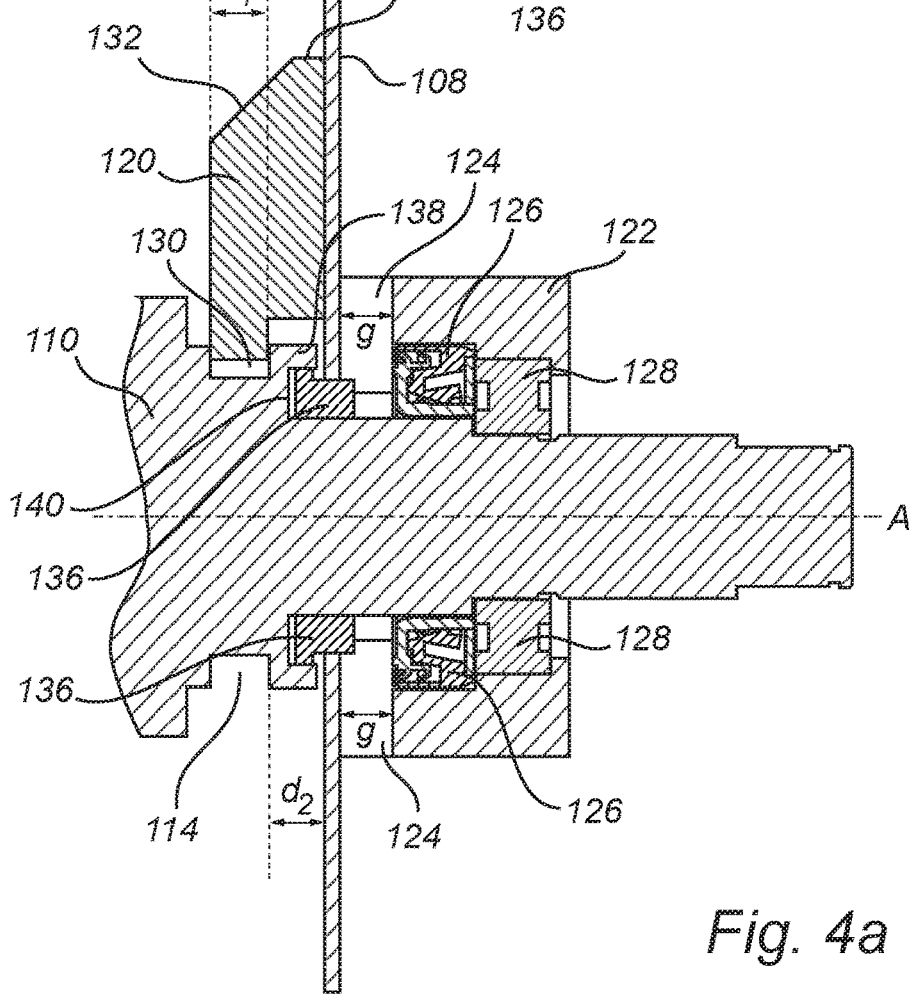
FIG. 4a is an enlarged cross section of the shaft arrangement shown in FIG. 2.
Figure 4B:
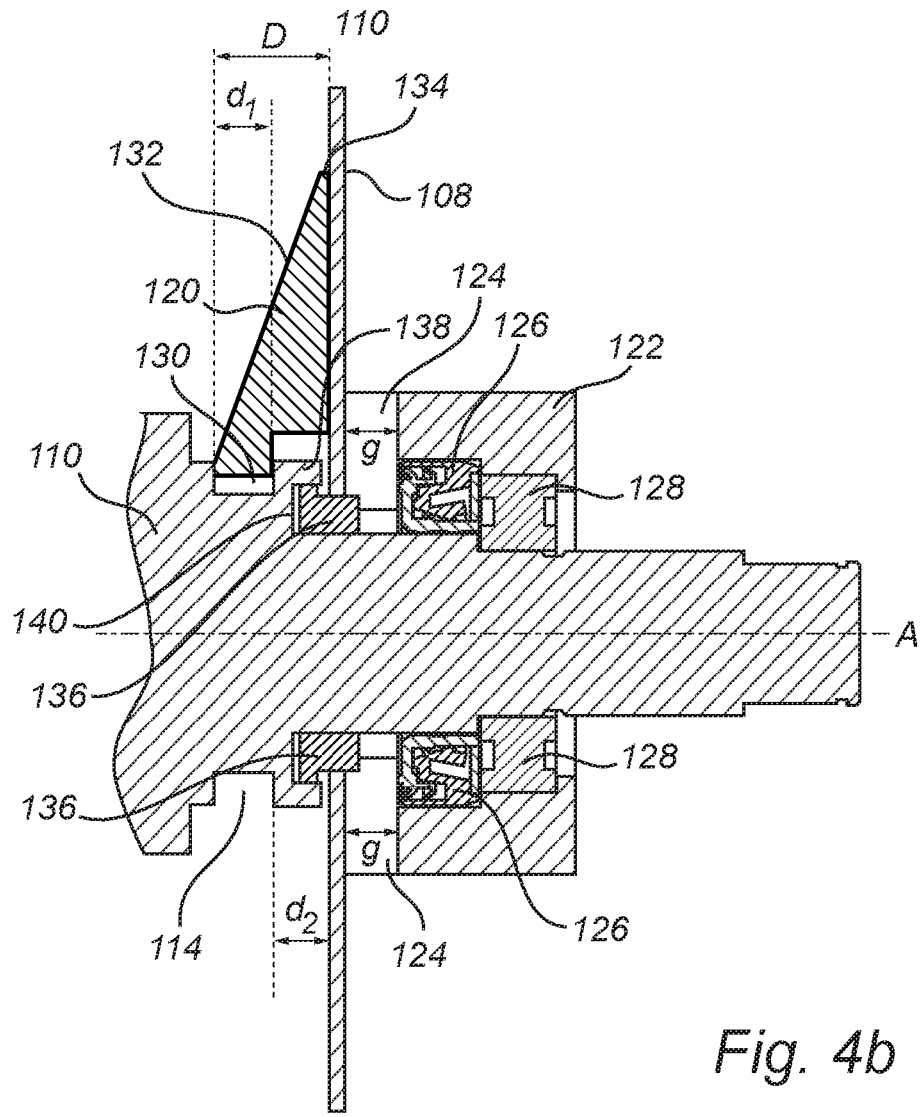
FIG. 4b is an enlarged cross section of an alternative shaft arrangement.

FIG. 2 is a perspective view of a shaft arrangement of the present invention, FIG. 3 shows a cross section of the shaft arrangement along the line X and arrows in FIG. 2, and FIGS. 4a and 4b shows a cross section of the shaft arrangement along the line Y and arrows shown in FIG. 2.

In FIG. 3, the two bearings 128 arranged in the bearing block 122 and connected to each one of the first and second shafts 110, 112 are shown. The shaft arrangement further comprises seals 136 arranged around the outer surface of the first and second shaft 110, 112 at the openings 115, 117. One of the seals 136 is arranged in the opening 115 between the first shaft 110 and edges of the opening 115, and the other one of the seals 136 is arranged in the opening 117 between the second shaft 112 and edges of the opening 117. The seals 136 are attached either to the edges of the opening 115, 117 and/or to the sidewall 108. Hence, the seals 136 do not rotate with the shafts 110, 112. The seals 136 are preferably made of a plastic material. As an alternative not illustrated in the appended drawings, the seals 136 may be formed by a portion the sidewall 108. For example the opening 115, 117 may be formed by punching and/or drawing the metal, whereby the edges of the openings 115, 117 may form a shape corresponding to the seals 136 shown in FIGS. 3 and 4.

The first and second shaft 110, 112 further comprise a flange 138 which extends along the outer surface of each shaft in the axial direction towards the sidewall 108 to form an axial groove 140 arranged between the radial groove 114 and the openings 115, 117. The axial groove 140 may receive a portion of the seal 136 as shown in FIGS. 3 and 4 in order to provide a longer path for a liquid to traverse along the shafts 110, 112 before reaching the bearings 128.

As the bearing block 122 is arranged space apart from the sidewall 108 by the spacers 124 a gap g is created. The gap g is at least 4 mm wide or between 4 and 10 mm and may have any width in between 4 and 10 mm. The sidewall 108 and the bearing block 122 may be understood to have substantially parallel surfaces facing each other. Therefore, the width of gap g can be substantially the same between the surfaces of the sidewall 108 and the bearing block 122 which are facing each other.

The shaft arrangement further comprises bearing seals 126 arranged in the bearing block 122 between the bearing 128 and the gap g along the first and second shafts 110, 112. The bearing seals 126 are arranged in the bearing block 122 to prevent liquids which reach the bearing block 122, along the shafts 110, 112, from reaching the bearings 128.

In FIGS. 4a and 4b the plate 120 is shown with a protruding portion 130 which extends into the radial groove 114 of the first shaft 110 to form a passage between the radial groove 114 and the plate 120. The radial groove 114 is arranged at a distance $d_2$ from the sidewall. The distance $d_2$ is approximately 12 mm. The distance $d_2$ may of course be larger or smaller, such as 25-10 mm or any value in between.

Returning to FIGS. 1 and 2, note that the plate 120, and the protruding portion 130 extend partially around each shaft 110, 112, preferably orthogonally to said axial direction. The plate 120 extends for about at least 50% around the outer surface the first and second shafts 110, 112, preferably orthogonal to said axial direction. It is of course possible that the plate 120 and protruding portion 130 extends partially around each shaft 110, 112 for 10%, 25% or 50% or more of the outer surface of each shaft 110, 112. It would also be possible that the plate 120 and protruding portion 130 extends fully around each shaft 110, 112. As an alternative, the plate 120 and protruding portion 130 may extend a different amount around the outer surface of one of the shafts 110, 112 compared to the other one of the shafts 110, 112.

Referring now to FIGS. 4a and 4b, the radial groove 114 has a width $d_1$ which is slightly larger than the width of the protruding portion 130 such that the protruding portion 130 may extend into the radial groove 114 with a clearance to the surfaces of the radial groove 114, e.g. without being in contact with the surfaces of the radial groove 114. The clearance between the protruding portion 130 and the radial groove 114, e.g. the surfaces of the radial groove 114, may be approximately 1 mm. For example, the width $d_1$ of the radial groove 114 may be 6-13 mm, and the width of the protruding portion 130 may be 5-12 mm. For example, the width of the protruding portion 130 may be 9.5 mm and the width $d_1$ of the radial groove 114 may be 10.5 mm.

The clearance created by the different widths of the radial groove 114 and the protruding portion 130 may be configured in order to avoid any capillary forces or effects from drawing liquids through the passage. Note that the radial groove 114 and the protruding portion 130 in FIGS. 4a and 4b has a rectangular cross section. The rectangular cross section may make the radial groove 114 and protruding portion 130 easy to manufacture e.g. by machining the first shaft 110 and the plate 120. As an alternative the radial groove 114 and the protruding portion have rounded corners and edges, such that the bottom of the radial groove 114 is shaped as a half-circle as seen in the cross section of FIGS. 4a and 4b. Other shapes of the radial groove 114 and a matching or corresponding shape of the protruding portion 130 is of course also possible and within the scope of the invention.

The protruding portion 130 is arranged at a first end of the plate 120. The plate 120 has a second end 134, opposite the first end. Between the first and second end 134 the plate 120 has a tapered portion 132. The tapered portion 132 tapers towards the second end 134 and the sidewall 108 as seen from the first end. The second end 134 comprises a flat portion which is perpendicular to the sidewall 108. It is possible that the tapered portion 134 extends fully to the sidewall 108 and that there is no flat portion at the second end 134. The tapered 132 portion may extend for only a portion of the plate 120 as shown in FIG. 4a. Alternatively, the plate may be wedge-shaped, where the wider part of the wedge is arranged towards the protruding portion 130 and the thinner part of the wedge is arranged towards the second end 134 and wherein the tapered portion 132 may extend the full distance or substantially the full distance between the protruding portion 130 and the second end 134, as shown in FIG. 4b. The plate 120 has a thickness D corresponding to the thickness at the first end of the plate 120. The thickness D of the plate 120 is preferably less than 25 mm in the axial direction, e.g. as seen along the longitudinal axis a in FIGS. 4a and 4b The thickness D of the plate may be less than 25 mm, whereby the width $d_1$ of the radial groove 114 and the corresponding width of the protruding portion 130 may also be reduced. Alternatively, the distance $d_2$ at which the radial groove 114 is arranged from the sidewall 108 can be reduced in order to allow the radial groove 114 and the protruding portion 130 to retain their width as the thickness D of the plate 120 decreases. The plate 120 can be formed in a single piece of solid material, such as a plastic material.

Figure 5:
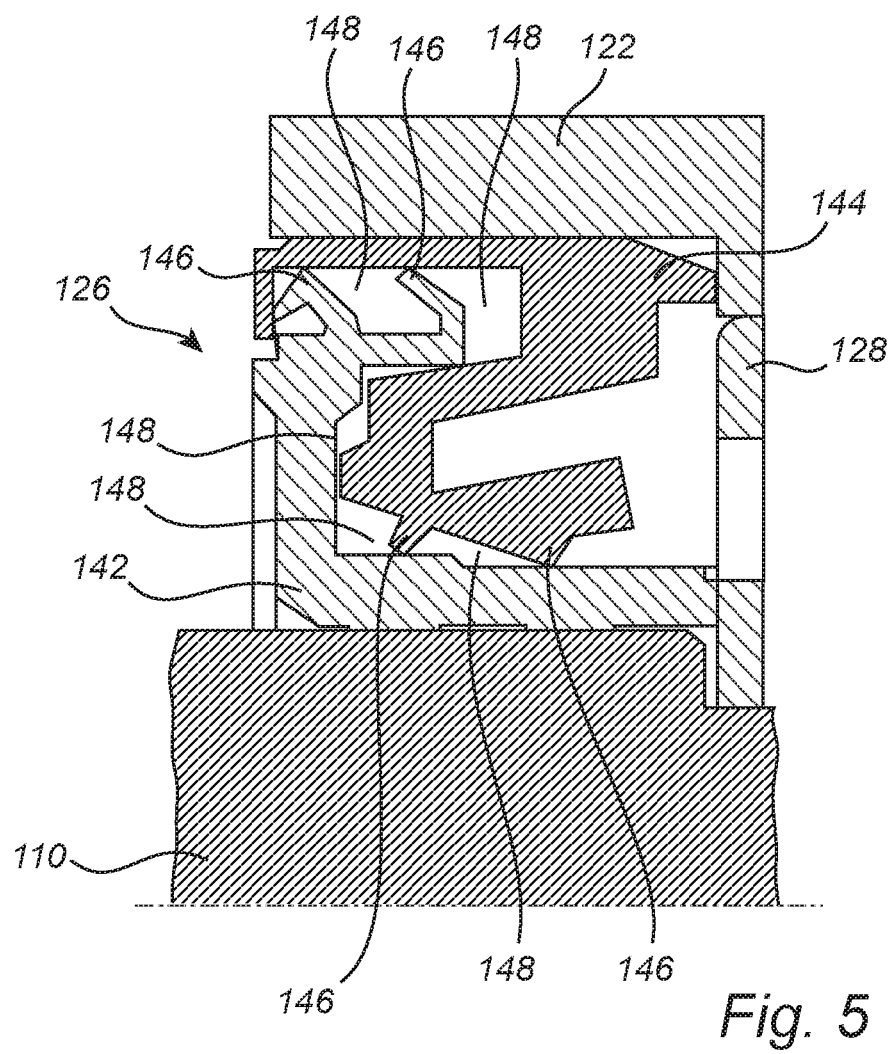
FIG. 5 is a cross section of a bearing seal in the shaft arrangement.

FIG. 5 is a cross section of the bearing seal 128 connected to the first shaft 110. The bearing seal 128 comprises an inner ring 142 connected to the first shaft 110, and an outer ring 144 connected to the bearing block 122. The inner and outer ring 142, 144 may be L-shaped as seen in the cross section of FIG. 5. The inner and outer ring 142, 144 may rotate relative each other. Hence, the inner ring 142 can be attached to the first shaft 110 and the outer ring 144 can be attached to the bearing block 122. The axial and radial sections of the inner and outer ring 142, 144 are aligned approximately in parallel to each other. The bearing seal 128 further comprises a plurality of sealing lips 146 extending from the inner ring 142 towards the outer ring 144, and from the outer ring 144 towards the inner ring 142. The sealing lips 146 form sealing chambers 148 between themselves in a direction orthogonal to the axial direction of the first shaft 110, i.e. in the radial direction. The sealing chambers 148 are understood to extend along the radial path around the shaft 110 created between the inner 142 and outer ring 144 of the bearing seal 126. The sealing chambers 148 are filled with grease or another composition or material which further prevents liquids from entering or passing the bearing seal 126.

Other examples and variation of the invention than the ones shown are of course possible. For example, there may be more than one radial groove arranged along the longitudinal extension of the shafts, and thus more than one protruding portion extending into the radial groove(s) to form several passages which a liquid has to traverse. There may be additional seals arranged within the shaft arrangement. The profile or cross section of the shafts as seen in the longitudinal directions in FIGS. 3 and 4 may of course vary. Another example is to include a refill nipple at the bearing block 122 connected the bearing seal 126 such that the sealing composition within the sealing chambers may be refilled through the refill nipple.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination may not be used to an advantage.

The invention claimed is:

1. A shaft arrangement in a reverse vending machine comprising:
   a sidewall having an inside and an outside, and at least one opening;
   at least one shaft extending through the at least one opening and the at least one shaft comprises a radial groove;
   a bearing arrangement arranged on the outside of the sidewall, the bearing arrangement comprises a bearing block and a bearing connected to the at least one shaft;
   a seal arranged in the at least one opening and around the at least one shaft at the at least one opening;
   wherein the bearing block is arranged spaced apart from the sidewall to create a gap (g) between the sidewall and bearing block, and
   wherein the shaft arrangement further comprises a plate arranged on the inside of the sidewall, the plate comprises a protruding portion that extends into the radial groove so as to form a passage between the radial groove and the plate.

2. The shaft arrangement according to claim 1, wherein the at least one shaft further comprises a flange extending axially towards the sidewall to form an axial groove, between the radial groove and the at least one opening, to receive the seal.

3. The shaft arrangement according to claim 1, wherein the seal is arranged in the at least one opening in the sidewall.

4. The shaft arrangement according to claim 3, wherein the seal is arranged between the at least one shaft and edges of the at least one opening.

5. The shaft arrangement according to claim 1, the bearing arrangement further comprises a bearing seal, which comprises an inner ring attached to the at least one shaft and an outer ring attached to the bearing block such that the inner ring and the outer ring may rotate relative each other, wherein the bearing seal is arranged between the bearing and the gap (g) along said at least one shaft.

6. The shaft arrangement according to claim 5, wherein the bearing seal further comprises at least two sealing lips forming sealing chambers between the at least two sealing lips in a direction orthogonal to an axial direction.

7. The shaft arrangement according to claim 6, wherein the sealing chambers are filled with a sealing composition.

8. The shaft arrangement according to claim 1, wherein the radial groove is arranged at a distance ($d_2$) from the sidewall.

9. The shaft arrangement according to claim 1, wherein the protruding portion extends partially around the at least one shaft, and around at least 10% of an outer surface of the at least one shaft.

10. The shaft arrangement according to claim 1, wherein the gap (g) is at least 4 mm wide or the gap (g) is at least 5 mm wide or the gap (g) is at least 6 mm wide.

11. The shaft arrangement according to claim 1, wherein the protruding portion is arranged at a first end of the plate, and the plate comprises a second end, opposite the first end, and a tapered portion arranged between said first end and said second end, wherein the tapered portion tapers towards the side wall as seen from the first end.

12. The shaft arrangement according to claim 11, wherein a thickness (D) of the plate is less than 25 mm at the first end of said plate and in an axial direction.

13. The shaft arrangement according to claim 1, wherein the at least one shaft is used for compressing containers when the reverse vending machine is in use.

* * * * *